Sept. 22, 1970  J. A. HODGKINS  3,530,355
AUTOMATIC CONTROL SYSTEMS
Filed Oct. 14, 1968  11 Sheets-Sheet 2

J. A. Hodgkins
Inventor
by Hall, Pollock & Vande Sande
Attorneys

Sept. 22, 1970

J. A. HODGKINS 3,530,355

AUTOMATIC CONTROL SYSTEMS

Filed Oct. 14, 1968

J.A. Hodgkins
Inventor by Hall, Pollock & Vande Sande
Attorneys

Sept. 22, 1970  J. A. HODGKINS  3,530,355
AUTOMATIC CONTROL SYSTEMS
Filed Oct. 14, 1968  11 Sheets-Sheet 6
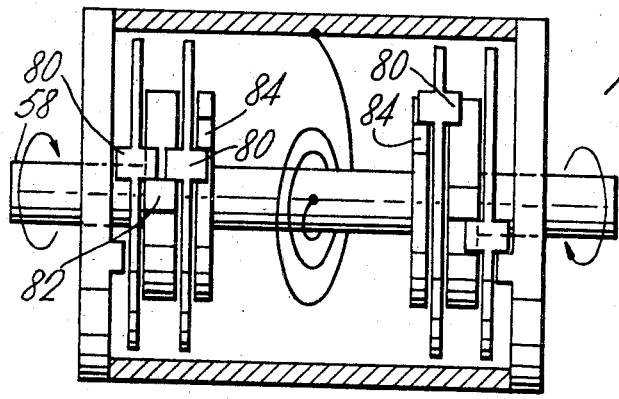
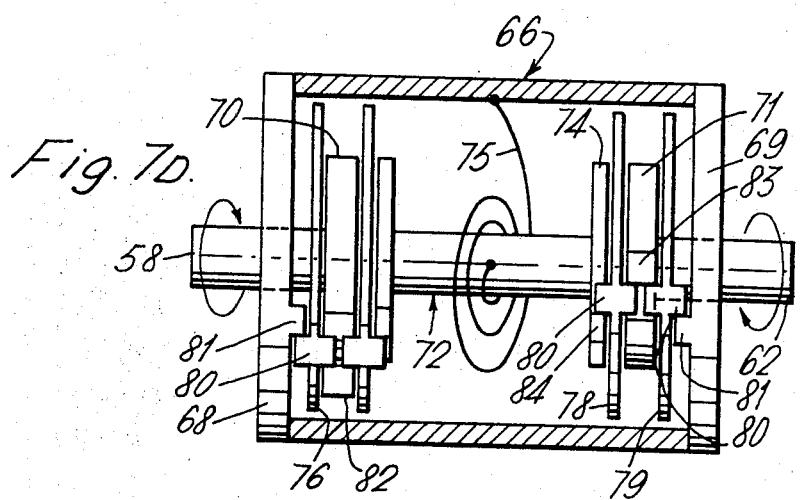
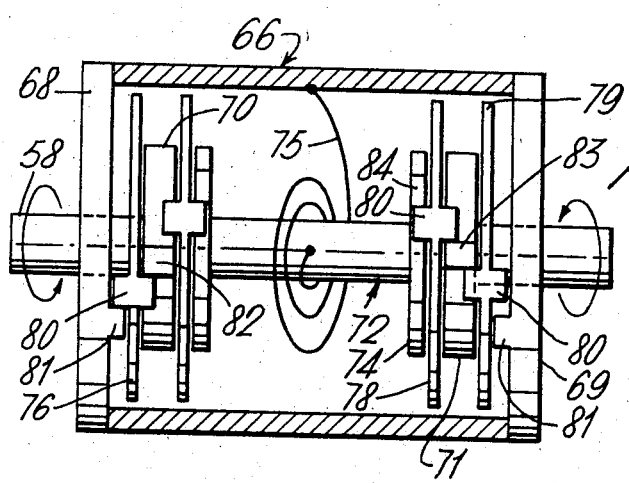
J. A. Hodgkins
Inventor
by Hall Pollock & Vande Sande
Attorneys

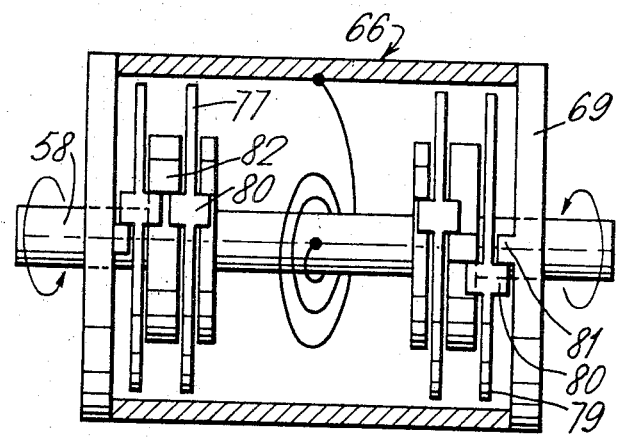
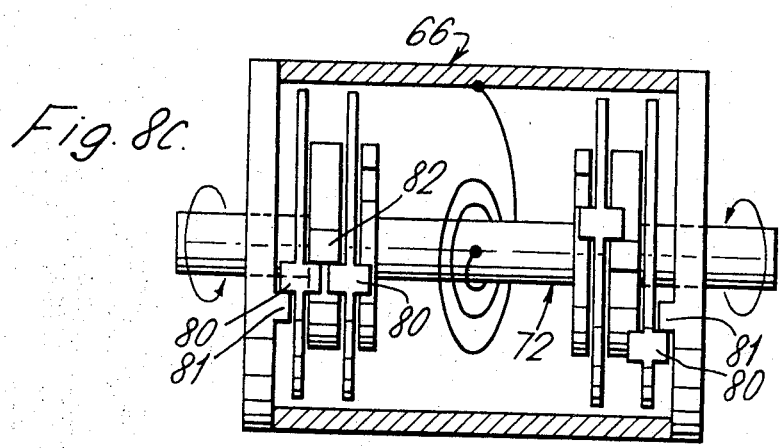
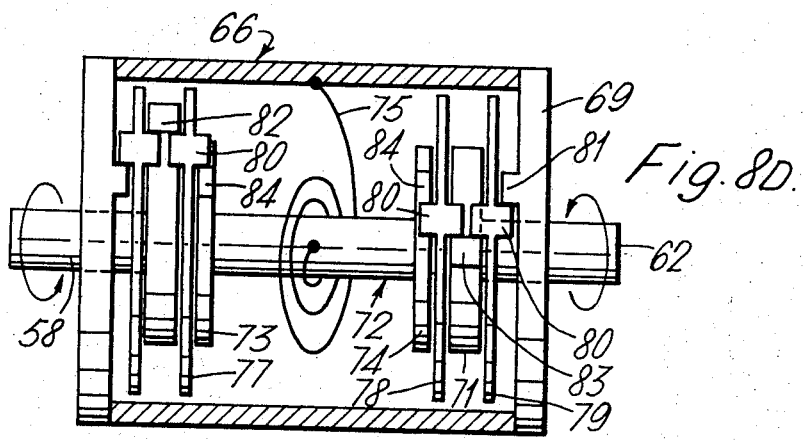

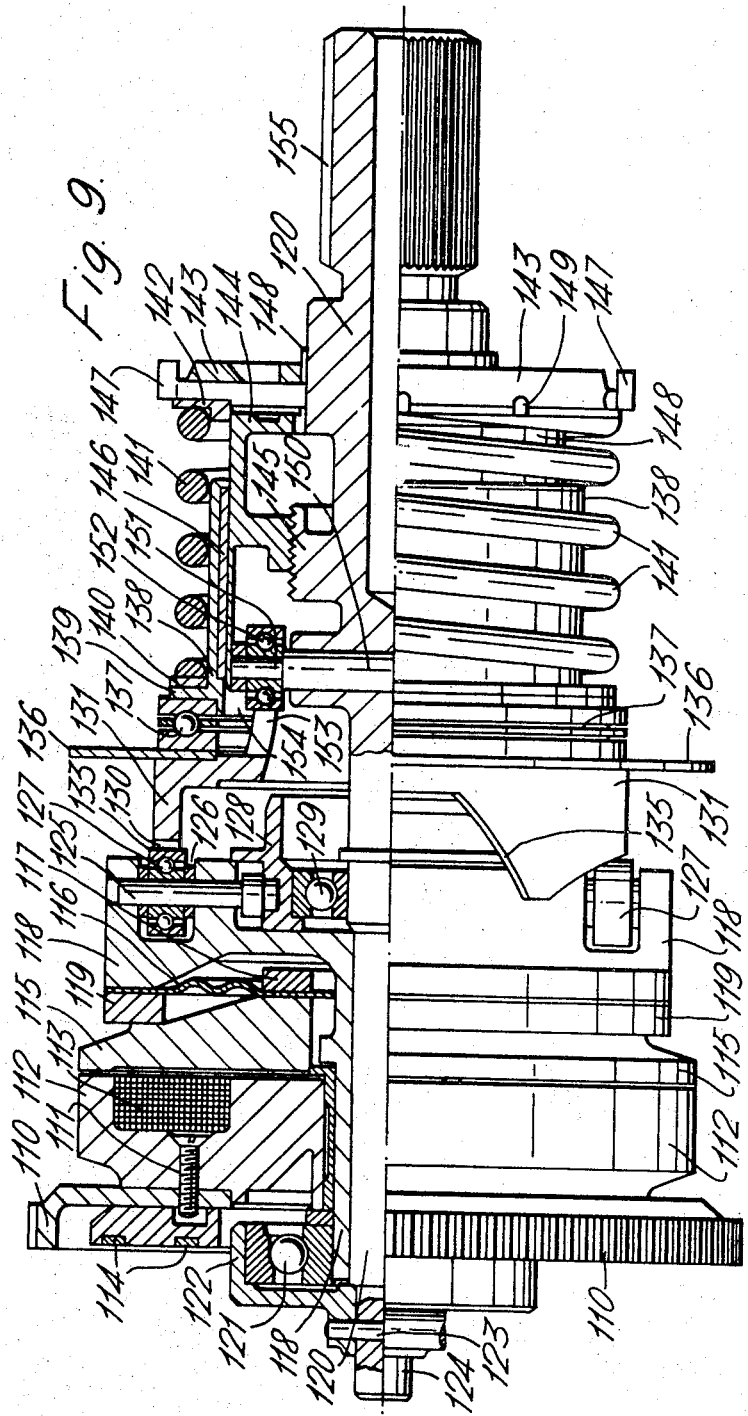

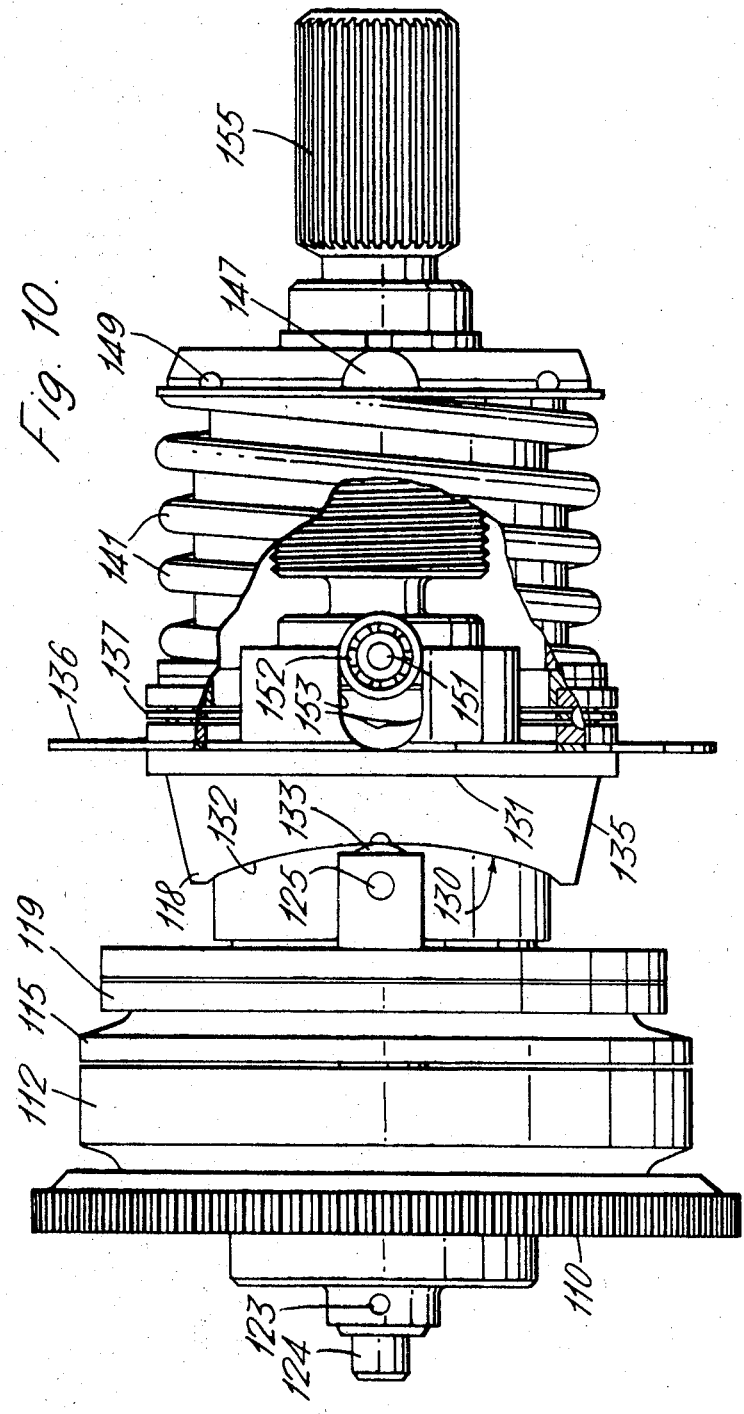

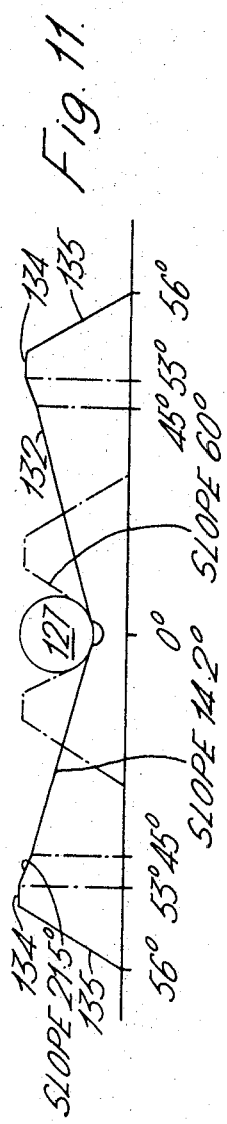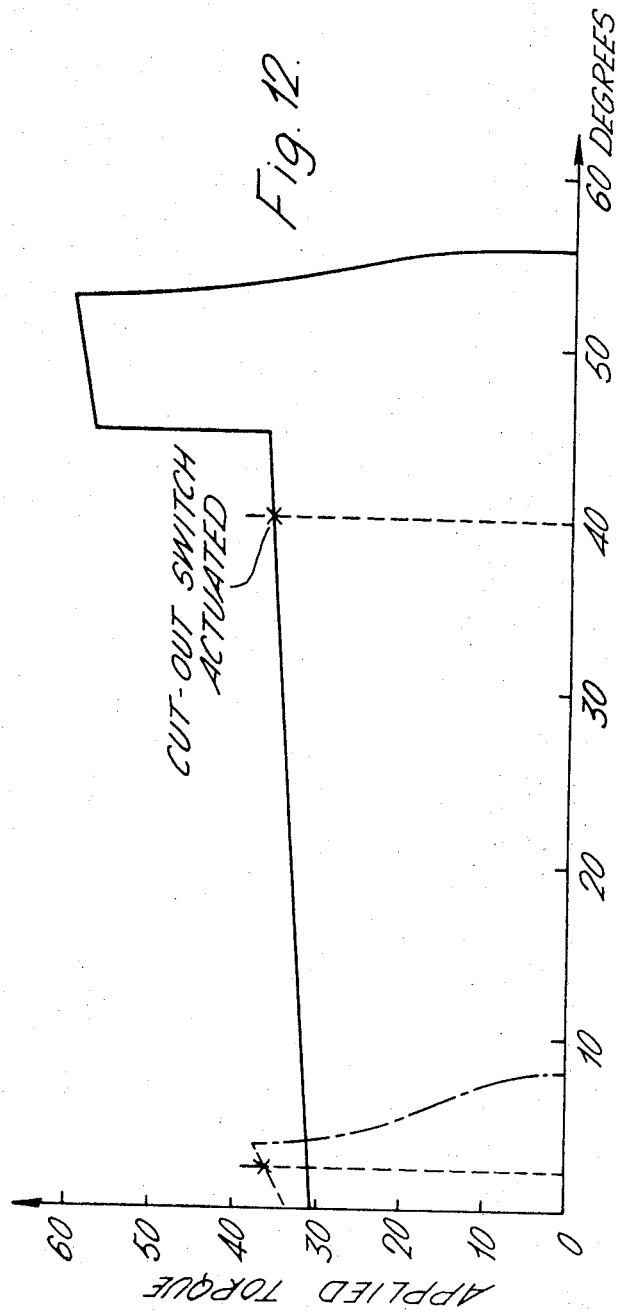

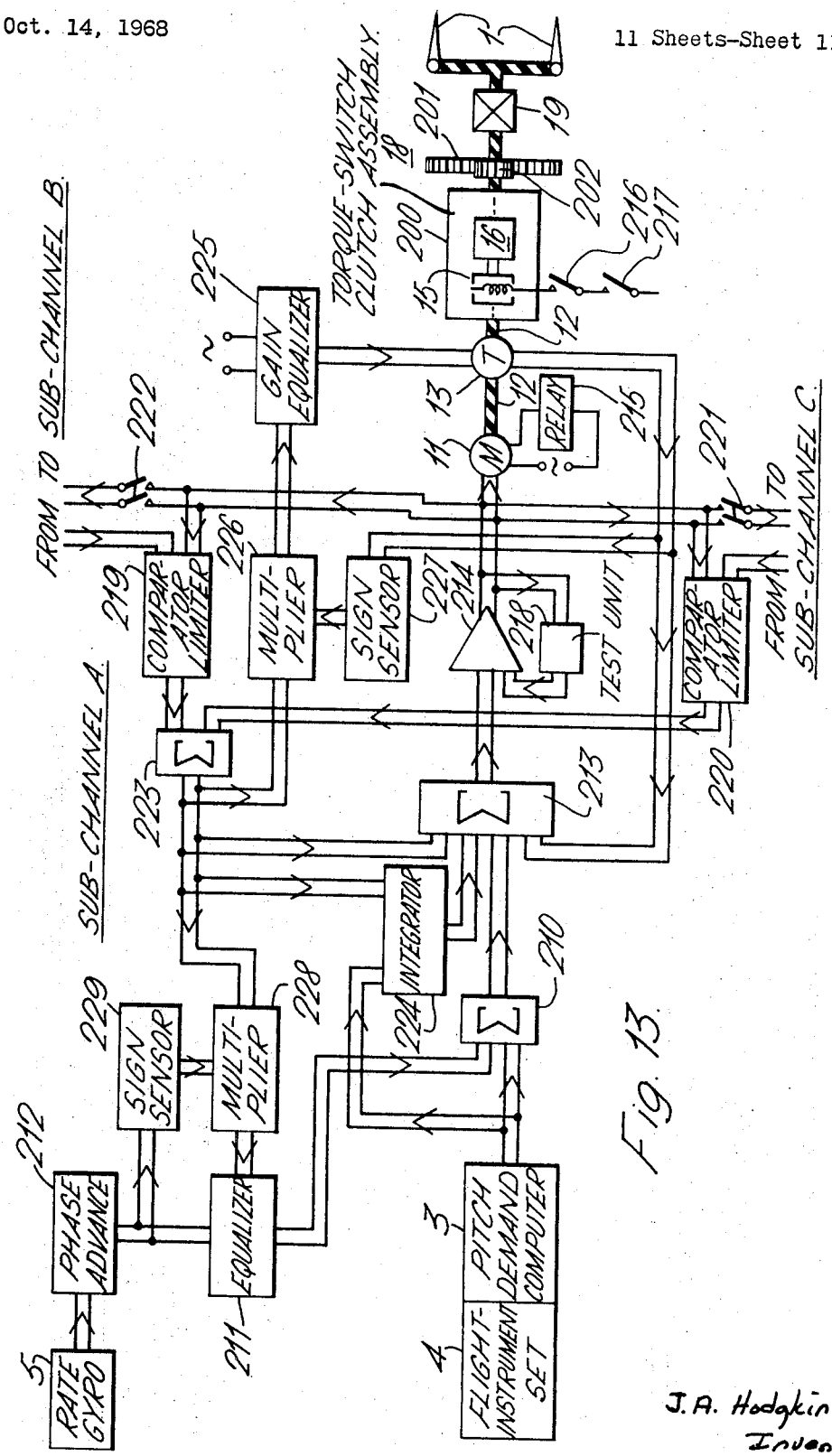

United States Patent Office 3,530,355
Patented Sept. 22, 1970

3,530,355
AUTOMATIC CONTROL SYSTEMS
John Alfred Hodgkins, Staverton Lea, Staverton,
Cheltenham, Gloucestershire, England
Filed Oct. 14, 1968, Ser. No. 767,130
Int. Cl. G05b *13/02*
U.S. Cl. 318—564                                      21 Claims

ABSTRACT OF THE DISCLOSURE

A triplex servo channel of an aircraft flight-control system includes equalization balancing out acceptable long- and short-term inequalities between the three servo sub-channels. Each sub-channel servomotor is coupled to a common output of the sub-channels via a torque-switch that de-clutches its sub-channel under excessive torque-loading. The torque-switch has a lost-motion characteristic for restricting de-clutching to sustained loadings and thereby suppress transients of acceptable short period.

---

This invention relates to automatic control systems.

The invention is particularly concerned with automatic control systems of the kind using multiplex techniques. Automatic control systems of this kind have application, for example, in the automatic control of flight of aircraft, where it is desired to reduce the likelihood that faults arising during operation of the system will affect its integrity.

The present invention provides an automatic control system that comprises a drivable output member and a multiplex control-channel for driving the output member, wherein said control-channel is formed by at least two sub-channels for providing nominally-equivalent output drives to the output member and includes an equalizing arrangement for acting in the sub-channels to balance out operationally-acceptable differences arising between them. The equalizing arrangement includes both long-term and short-term equalizing means for balancing out any differences that would otherwise result in substantially-continuous and transient disagreements of less than a predetermined threshold level between the output drives of the sub-channels. In addition, each sub-channel includes a selectively-disengageable coupling for applying the output drive of the respective sub-channel to said output member, and disengaging means operable to disengage the said coupling in response to disagreement exceeding said threshold level between the output drive of the respective sub-channel and the output drive applied to the said output member by each other of said sub-channels. According to the invention the disengaging means of each sub-channel has a delayed-operation characteristic so as to provide for the disengagement of its associated coupling only in response to sustained disagreement in excess of said threshold level, whereby short-period transient disagreements are ineffective to produce disengagement of the coupling.

Previously with automatic control systems using multiplex techniques it has been the practice to arrange that disengagement of the individual sub-channels takes place almost immediately any disagreement beyond the predetermined threshold level occurs. The present invention recognizes that with departure from this practice the disadvantage of frequent and unnecessary disengagement experienced with prior systems, can be avoided to a substantial extent and without significantly impairing the integrity of the system.

The said disengaging means of each sub-channel may comprise input and output elements mounted for displacement relative to one another, means actuable to disengage the coupling in response to displacement of a predetermined substantial extent between said input and output elements, and means for opposing resiliently any said displacement of said input and output elements relative to one another. The coupling itself may be an electromagnetic clutch, and in these circumstances the said disengaging means may include an electric switch that is actuated in response to the displacement between the said input and output elements so as then to interrupt an energization path individual to the clutch.

Each sub-channel may include in addition to an electrical servomotor for providing the output drive of the respective sub-channel and an electrical servoamplifier for supplying an electric signal to energize the servomotor, a comparator for comparing the energizing signal with the corresponding energizing signal supplied by the servoamplifier of another of said sub-channels. In these circumstances the comparator may be arranged to derive a signal dependent upon any difference between the compared signals and to supply this to a feedback arrangement of the sub-channel such that a component of degenerative feedback provided in the sub-channel is dependent upon the difference signal.

An automatic control system in accordance with the present invention will now be described, by way of example, with reference to the accompanying drawings, in which.

Figure 1:
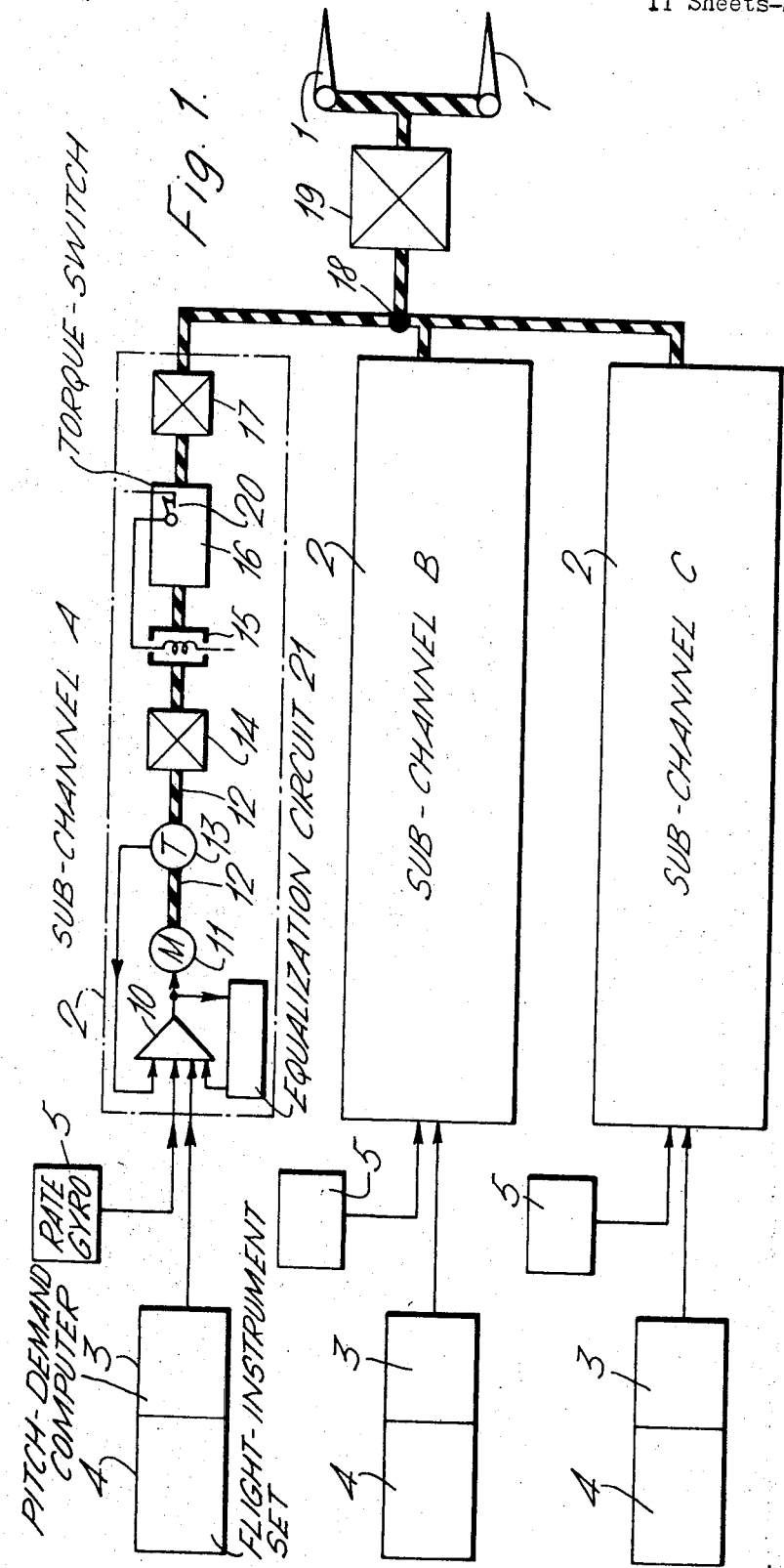
FIG. 1 is a schematic representation of the automatic control system.
Figure 4:
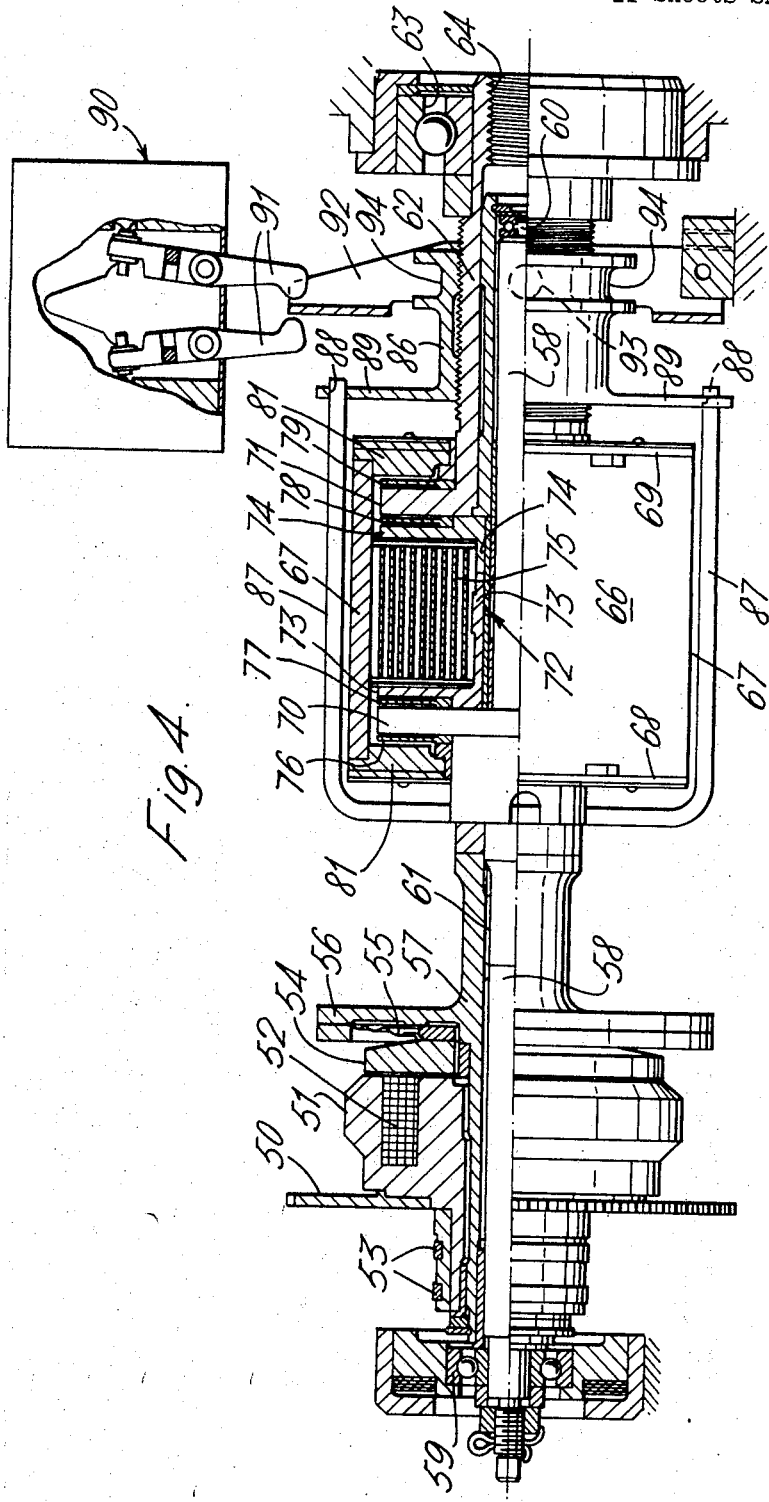
FIG. 4 is a sectional side-elevation of an assembly of a clutch and torque-switch that is for use in each of three sub-channels of the automatic control system of FIG. 1.
Figure 6:
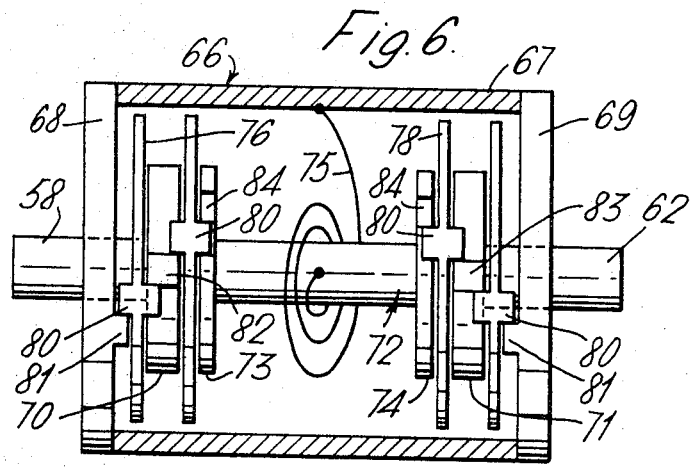
FIG. 6 is a schematic representation of the lost-motion device shown in FIG. 5.

FIGS. 7 and 8 each illustrate in the schematic format of FIG. 6, successive stages of operation of the lost-motion device, the successive stages for one operative condition being illustrated by different parts A to D of FIG. 7, and for an alternative operative condition being illustrated by different parts A to D of FIG. 8;

FIG. 9 is a sectional side-elevation of an assembly that may be used in the automatic control system of FIG. 1 as an alternative to the assembly of FIG. 4;

FIG. 10 is a plan view of the assembly of FIG. 9;

FIG. 11 is a development of a cam-track used in the assembly of FIGS. 9 and 10;

FIG. 12 is illustrative of an operational characteristic of the assembly of FIGS. 9 and 10; and FIG. 13 is a schematic representation showing details of construction of one of the sub-channels of the automatic control system of FIG. 1.

The automatic control system to be described is a triplex system for use in controlling flight of an aircraft, the system being coupled to the elevator control-surfaces of the aircraft to control the aircraft in pitch during, for example, an automatic-landing manoeuvre.

Referring to FIG. 1, the angular setting of a pair of elevator control-surfaces 1 is controlled by a control-channel consisting of three nominally-identical sub-channels 2 that operate in parallel with one another and are herein differentiated from one another by the letters A, B and C. The three sub-channels 2 control movement of the surfaces 1 in accordance respectively with signals that are supplied from three nominally-identical pitch-demand computers 3, each such signal being representative of a demand for rate of change of pitch attitude of the aircraft. The demand signal is in each case derived from signals supplied by a respective one of three nominally-identical sets 4 of flight instruments.

Each flight-instrument set 4 includes, inter alia, a vertical gyroscope, a glide-path radio receiver and a radio altimeter, and the signals supplied by the instruments of the set are utilized selectively in the relevant pitch-demand computer 3 according to the setting of a flight-controller (not shown). The flight-controller, which is common to all three sub-channels 2, is set by the pilot of the aircraft in accordance with the mode of flight desired and in each pitch-demand computer 3 is associated with a switching circuit that is switchable from one to another of a plurality of states to change the mode of operation of the respective computer 3. When, for example, the flight-controller is set by the pilot to select automatic landing of the aircraft, each switching circuit is thereby primed ready to execute a switching sequence in which the successive steps of the sequence take place as the aircraft descends through successive height-levels above the ground. The automatic landing manoeuvre is executed in discrete phases that follow on one after the other as the aircraft descends through these height-levels, and once the manoeuvre is initiated by the pilot, so the successive steps of the switching sequence bring about the changes from one phase to another in the operational mode of the pitch-demand computer 3. The control law according to which the demand is derived is changed from one phase to another by the switching operation, the descent of the aircraft to the appropriate height-level for the change, being detected in each case by reference to the output signal of the radio altimeter in the associated flight-instrument set 4. Details of the switching circuits, and the manner in which they operate and are coordinated to one another so that switching takes place simultaneously in the three computers 3, are described in U.S. Pat. No. 3,190,586 issued June 22, 1965, and naming D. W. Righton as inventor.

The three nominally-equivalent demand-signals applied from the computers 3 to the respective sub-channels 2, are opposed respectively by the signals supplied by three nominally-identical rate-gyroscopes 5. Each rate-gyroscope 5 is mounted in the aircraft to sense the actual rate of change of pitch attitude of the aircraft, and the signals supplied by the three rate-gyroscopes 5 provide nominally-equivalent measures of this rate. The three sub-channels 2 act in concert to drive the elevator surfaces 1 in a manner to maintain substantial equality between the pitch-rate demanded by the computers 3 and the actual pitch-rate sensed by the rate-gyroscopes 5, so as thereby to comply with the demand.

Each sub-channel 2 includes a servo-amplifier stage 10 that receives the signals from the relevant computer 3 and rate-gyroscope 5, and derives therefrom a command for rate of movement of the elevator control-surfaces 1. A servomotor 11 having a shaft 12 coupled to a tacho-generator 13, is energized in accordance with this command. The signal derived by the tacho-generator 13, which signal is in accordance with the rate of rotation of the shaft 12, is supplied to the amplifier stage 10 as degenerative feedback, and in this way the rate of rotation of the shaft 12 is maintained at a value dependent upon the command.

The shaft 12 is coupled via reduction gearing 14 and an electromagnetic clutch 15 to a torque-switch 16, and from there is coupled through further reduction gearing 17 to a mechanical coupling point 18 common to all three sub-channels 2. The combined drive applied from the three sub-channels 2 to the common point 18 is conveyed to the control-surfaces 1 via further reduction gearing 19.

Engagement of the channel to control the elevator control-surfaces 1 automatically, is effected by operation of energization circuits of the individual electromagnetic clutches 15. Details of these circuits and the manner in which they operate, are described in U.S. Pat. No. 3,136,923 issued June 19, 1964, and naming R. J. Treadwell as inventor, and it is sufficient here simply to refer to the fact that the energization circuit of the clutch 15 in each sub-channel 2 includes electrical coupling to the torque-switch 16 of that same sub-channel.

Each torque-switch 16 is a mechanical device that provides a substantially-solid coupling between the clutch 15 and gearing 17 of its sub-channel 2, as long as the torque-loading on the device remains below a pre-set threshold level. An electrical switch 20 in the device is actuated in response to sustained loading in excess of this threshold level, actuation of the switch 20 breaking the energization circuit of the electromagnetic clutch 15 in the relevant sub-channel 2, and thereby disengaging this sub-channel 2 from control of the control-surfaces 1.

The torque-loading experience by the torque-switch 16 in any one of the three sub-channels 2 exceeds the threshold level if the output drive of that particular sub-channel 2 differs significantly from the output drives of the other two sub-channels. These latter circumstances arise from fault conditions in the sub-channel 2 itself, or in the equipment individually associated therewith, and the response of the torque-switch 16 appropriately results in disengagement of this sub-channel 2 from control of the control-surfaces 1. There are, however, differences in the output drives of the three sub-channels 2 that arise during normal operation from inherent inequalities as between the nominally-identical sub-channels 2 themselves, and from inequalities between the nominally-identical signals supplied to them. Steps are taken to eliminate these acceptable differences using an equalization circuit 21 with each of the sub-channels 2.

Equalization to balance out the acceptable differences is provided by the circuits 21 either in the manner described in U.S. Pat. No. 3,156,855 issued Nov. 10, 1964, naming D. W. Righton and R. J. Treadwell as inventors, as illustrated schematically in FIG. 2 of the present drawings, or preferably, in the manner described in co-pending U.S. patent application Ser. No. 858,296 filed Sept. 16, 1969, in the name of Bishop et al., as illustrated schematically in FIG. 3 of these drawings. In both instances the equalization is provided in dependence upon the energization voltages supplied to the motors 11 by the amplifier stages 10, the voltage in each case providing a measure of the torque exerted by the relevant motor 11. With the cyclic-equalization arrangement of FIG. 2, each sub-channel 2 includes a comparator 22 that acts to compare the motor-energization voltage in its own sub-channel 2 with the corresponding voltage from the next sub-channel 2 taking the three sub-channels A, B and C in cyclic order; the comparator 22 derives a signal representative of the difference between the compared signals and supplies this via an associated limiter 23 to provide a basic equalization signal for the respective sub-channel. With the preferred symmetrical-equalization arrangement of FIG. 3, on the other hand, each sub-channel 2 includes two comparators 24 and 25 that serve to compare the motor-energization voltage of the sub-channel 2 with the corresponding voltages respectively of the other two sub-channels 2; the comparators 24 and 25 derive signals representative of the respective differences and supply these via individually-associated limiters 26 and 27 to be combined by an adder 28 into a basic equalization signal for the respective sub-channel.

Figure 2:
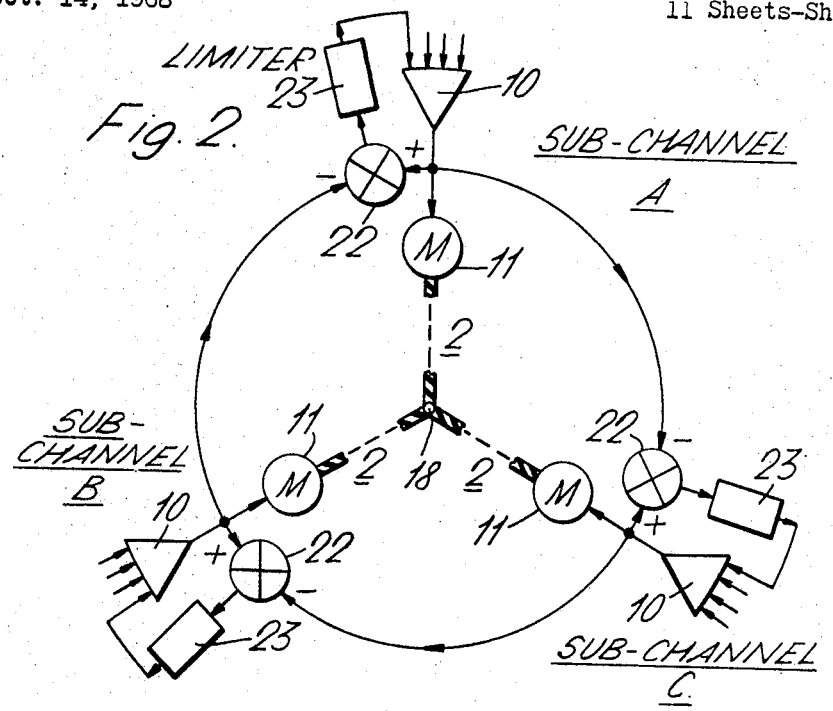
FIGS. 2 and 3 are simplified schematic representations of the automatic control system shown in FIG. 1, for providing illustration of alternative equalization arrangements used in the system.
Figure 3:
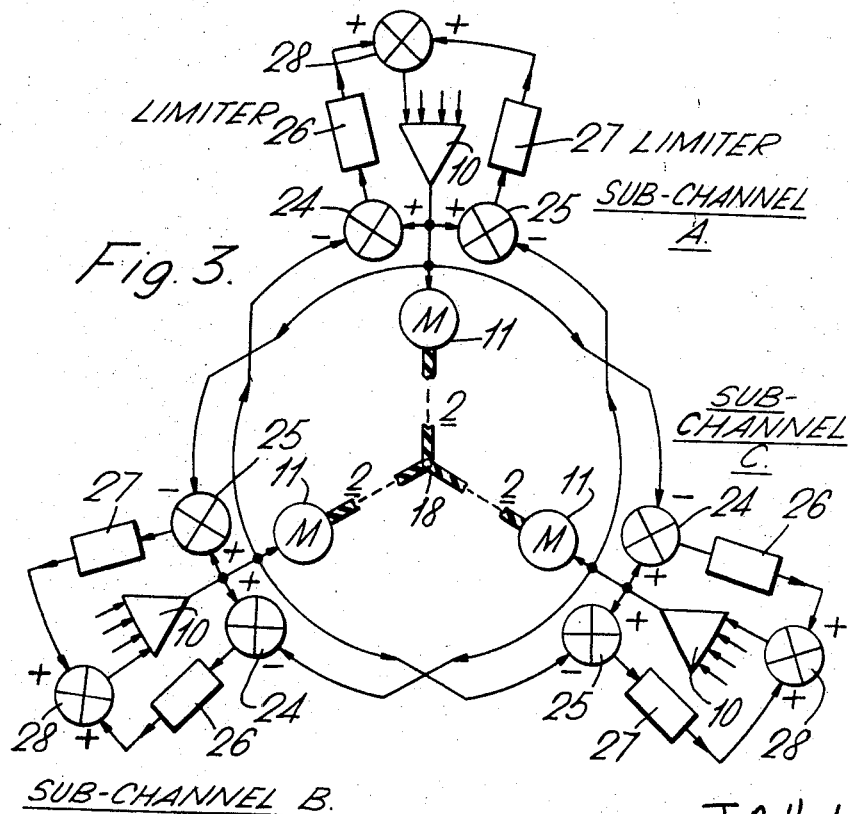

In each of the arrangements of FIGS. 2 and 3, the derived equalization signal is, as shown, supplied degeneratively to the amplifier stage 10 of the respective sub-channel 2, so as to correct specifically for short-term differences between the datum voltage-levels of the individual energization signals supplied from the amplifier stages 10 to the motors 11, that is to say, to correct for differences arising between the motor-energization voltages as a result of short-term variations in their notional zero-levels.

The equalization signal is also supplied (not shown) in the sub-channels 2 to provide three other forms of equalization, namely long-term datum equalization, gain equalization and input-gain equalization. Long-term datum equalization is provided by integrating with respect to time the basic equalization signal and applying the derived integral to the amplifier stage 10 degeneratively, whereas gain-equalization is provided by applying the equalization signal to regulate degeneratively the degree of rate-feedback (and therefore the overall gain of the servo) provided from the tacho-generator 13. Finally, input-gain equalization is provided in each sub-channel 2 by using the basic equalizing signal to regulate degeneratively the comparative magnitudes of the demand signal supplied by the pitch-demand computer 3 and the signal supplied by the rate-gyroscope 5.

The full equalization provided as described above with reference to FIGS. 2 and 3, is such as to ensure that normal differences arising between the nominally-identical sub-channels 2 of the system of FIG. 1 are balanced out, and in particular that there are no continuous, long-term differences between the torque outputs from the three motors 11. However, the steps taken are necessarily of somewhat limited effect as regards transient inequalities of short period arising between the sub-channels 2. In particular, transients having, for example, periods less than one-hundred milliseconds, may not be entirely balanced-out and accordingly may result in significant differences between the output drives of the sub-channels 2; however it is arranged in accordance with the present invention, that such short-term transients do not result in unnecessary disengagements of the sub-channels 2.

In the latter respect, each torque-switch 16 is arranged to provide for actuation of its cut-out switch 20 only when it experiences a torque-loading that is sustained in excess of the threshold level for a substantial period, in particular for a period longer than applicable to the normally-experienced short-period transients. To this end each torque-switch 16 allows for a degree of relative rotation between the output shaft of the clutch 15 and the input shaft to the gearing 17 under torque-loading in excess of the threshold level, and provides for actuation of its cut-out switch 20 only after a substantial, pre-set angle of relative rotation has been experienced. Short-period transients are ineffective to produce this pre-set angle of relative rotation, and accordingly do not result in disengagement of the sub-channels 2. On the other hand, a fault condition gives rise to a sustained torque-loading that is effective to actuate the cut-out switch 20, and thereby disengage the relevant sub-channel 2.

In general, the angle of relative rotation at which actuation of the cut-out switch 20 takes place is set to be as large as possible consistent with safety for the particular mode of flight involved.

An assembly of an electromagnetic clutch and torque-switch that may be used to provide the clutch 15 and torque-switch 16, together with the gearing 14 and 17, in each sub-channel 2 of the system of FIG. 1, is shown in FIG. 4.

Referring to FIG. 4, input drive to the assembly is applied from the servomotor 11 of the relevant sub-channel 2 to an input gear 50 that is secured to a rotatably-mounted yoke 51 of the electromagnetic clutch. Current is supplied to an energizing coil 52 of the yoke 51 via slip-rings 53 that are carried with the yoke 51.

Output drive from the electromagnetic clutch is taken from an armature 54 that is clamped to the inner peripheral portion of a corrugated, resilient angular-diaphragm 55. The outer peripheral portion of the diaphragm 55 is clamped to the flange 56 of a tubular carrier 57. The diaphragm 55 permits axial movement of the armature 54 relative to the carrier 57 during engagement and disengagement of the electromagnetic clutch, and at the same time provides, by virtue of a degree of preloading, spring bias that ensures positive disengagement when energization of the coil 52 ceases.

The carrier 57 and yoke 51 are both coaxial with a main shaft 58 that extends substantially the whole length of the assembly and is rotatably-mounted at either end within ball-bearings 59 and 60. The yoke 51 is rotatably-mounted on the carrier 57, whereas the carrier 57 is secured to the shaft 58 by splines 61. The output drive of the clutch is accordingly applied to the shaft 58, and from the shaft 58 is applied to the torque-switch of the assembly. The torque-switch has a tubular output-shaft 62 that is rotatably-mounted on the shaft 58 and within a ball-bearing 63. The open end of the shaft 62 within the ball-bearing 63 is provided with an internal thread 64 so as to allow for an external output-connection to be made to the assembly.

Figure 5:
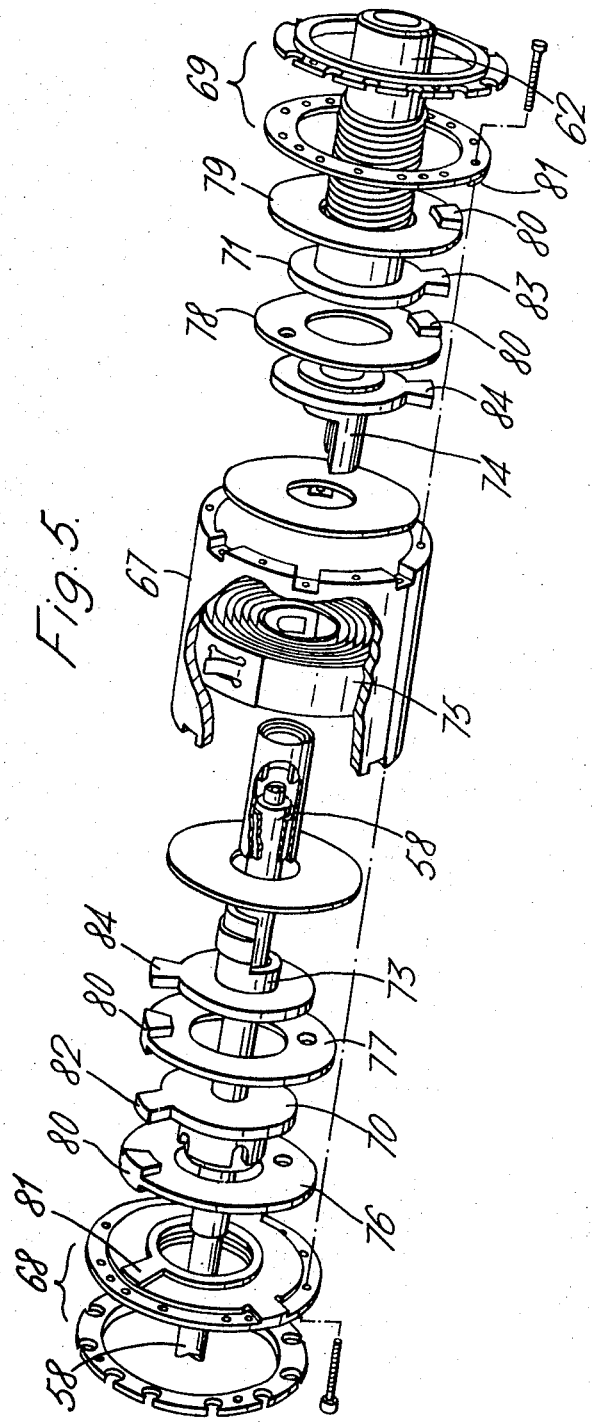
FIG. 5 is an exploded perspective view of a lost-motion device that forms part of the torque-switch in the assembly of FIG. 4.

The shafts 58 and 62 are intercoupled through a lost-motion device of the torque-switch. The lost-motion device as shown also in FIG. 5, is enclosed within a cylindrical barrel 66 formed by a cylindrical shell 67 and two identical end-caps 68 and 69, the end-caps 68 and 69 being clamped together upon the shell 67 and being rotatably-mounted on the shafts 58 and 62 respectively. Within the barrel 66 the shafts 58 and 62 have flanges 70 and 71 respectively, that are separated axially from one another by a double-flanged spring-spool 72 rotatably-mounted on shaft 58. The spool 72 is formed by two similar and axially-interfitting, flanged spool-parts 73 and 74, and holds a guarded spiral-spring 75. The inner end of the spring 75 is attached to the spool-part 73 whereas the outer end is attached to the shell 67 of the barrel 66.

The spring 75 is preloaded and thereby tends to produce rotation of the barrel 66 and spool 72 in opposite directions to one another. Such rotation is restrained by virtue of four identical and rotatably-mounted catch-plates 76 to 79 that each have a transversely-extending lug 80 and are respectively interposed between the end-cap 68 and flange 70, the flange 70 and the spool-part 73, the spool-part 74 and the flange 71, and the flange 71 and the end-cap 69. The manner in which the catch-plates 76 and 79 act in this respect, will be explained more particularly with reference to FIG. 6. FIG. 6 is a schematic representation of the lost-motion device as seen with the shell 67 partly cut away.

Referring to FIG. 6, the spring 75 acts on the barrel 66 in a sense to urge laterally-extending lugs 81 on the end-caps 68 and 69 against the lugs 80 of the catch-plates 76 and 79 respectively. The lugs 80 of the catch-plates 76 and 79 in their turn are urged against radially-extending lugs 82 and 83 of the flanges 70 and 71 respectively. At the same time the action of the spring 75 on the spool 72 urges radially-extending lugs 84 of the spool-parts 73 and 74 against the lugs 80 of the catch-plates 77 and 78, and these lugs 80, in their turn, engage with the lugs 82 and 83. The action of the spring 75 on the barrel 66 is thereby opposed at the flanges 70 and 71 by its equal and opposite action on the spool 72. The result of this is that until a torque-loading sufficient to overcome the preloading of the spring 75 is applied to the lost-motion device (either from the shaft 58 or from the output shaft 62), there is in effect a substantially solid coupling between the two shafts 58 and 62.

When torque-loading sufficient to overcome the preloading of the spring 75 is applied to the lost-motion device there is relative rotation between the shafts 58 and 62 from the normal relative orientation represented in FIG. 6. This relative rotation, irrespective of sense, winds up the spring 75 and thereby increases the resilient opposition to the applied torque. The full range of possible relative rotation between the shafts 58 and 62 is some 640 degrees, and the manner in which this is achieved will now be described briefly with reference to FIGS. 7A to D and 8A to D.

FIGS. 7A to D illustrate schematically successive stages through the range for one sense of relative rotatiton, and FIGS. 8A to D the corresponding stages for the other sense. In describing each stage it will be assumed that torque is being applied to the shaft 58 and that the shaft 62 is locked solid, the sense of the torque being indicated in the relevant figure by an appropriately-directed arrow embracing the shaft 58; however, the stage as illustrated is in each case equally-applicable to the circumstances in which the shaft 58 is locked solid and the torque is applied to the shaft 62 in the correspondingly-indicated opposite sense.

Figure 7A:
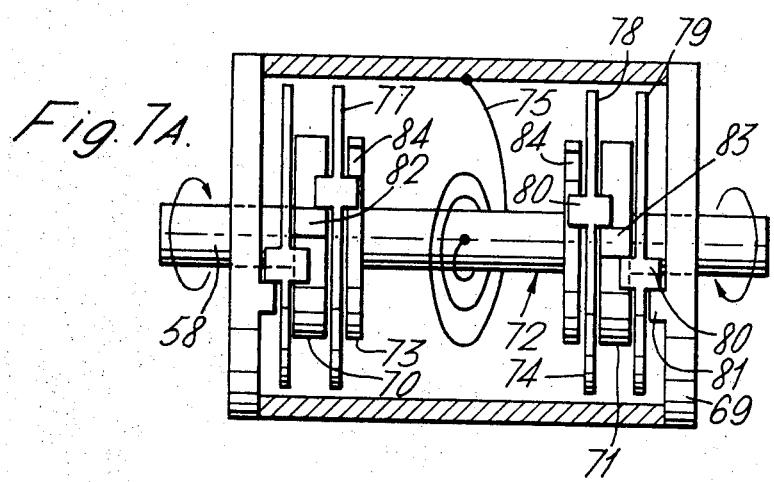

Referring to FIG. 7A, application to the shaft 58 of sufficient torque to overcome the preloaing of the spring 75 allows the shaft 58 to rotate and carry with it the spool 72. In this latter respect, the lug 82 on the flange 70 acts upon the lug 80 of the catch-plate 77 engaged with the lug 84 of the spool-part 73. The rotation of the spool 72 is in the sense to wind up the spring 75 and break engagement between the lug 84 of the spool-part 74 and the lug 80 of the catch-plate 78. Rotation of the barrel 66 is restrained by the lug 80 of the catch-plate 79 interposed between the lug 81 of the end-cap 69 and the lug 83 of the stationary flange 71.

Rotation of the shaft 58 and spool 72 together under increasing applied torque, continues with the same regime as illustrated in FIG. 7A up to approximately 300 degrees. After this the lug 82 engages the lug 80 of the catch-plate 76, and the lug 84 on the spool-part 74 engages the lug 80 of the catch-plate 78, as illustrated in FIG. 7B.

Figure 7B:
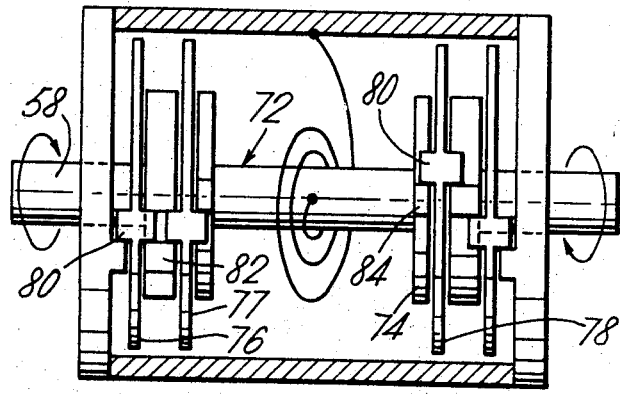

From the regime of FIG. 7B, the spool 72 and catch-plates 76 to 78 rotate with the shaft 58, the regime after rotation of the shaft 58 through one revolution being as illustrated in FIG. 7C.

When the shaft 58 has rotated through some 640 degrees, the lug 80 of the catch-plate 76 engages with the lug 81 of the end-cap 68, and the lug 80 of the catch-plate 78 engages with the lug 83 of the flange 71, as illustrated in FIG. 7D. Further rotation of the shaft 58 in the same sense relative to the shaft 62 is not possible; the barrel 66 is restrained from rotation in this sense by the lug 80 of the catch-plate 79 interposed between the lug 81 of the end-cap 69 and the lug 83 of the flange 71, and the spool 72 is restrained from rotation in the same sense by the lug 80 of the catch-plate 78 interposed between the lug 84 of the spool-part 74 and the lug 83 of the flange 71.

When the sense of torque applied to wind up the spring 75 is opposite to that applied in the case of FIGS. 7A to D, the initial regime, as illustrated in FIG. 8A, is one in which the lug 82 acts on the lug 80 of the catch-plate 76 engaged with the lug 81 of the end-cap 68. This causes rotation of the barrel 66 with the shaft 58, the spool 72 being restrained from rotation by the lug 80 of the catch-plate 78 interposed between the lug 84 of the spool-part 74 and the lug 83 of the stationary flange 71.

Rotation of the shaft 58 and barrel 66 together continues with the regime illustrated in FIG. 8A up to approximately 300 degrees, whereupon, as illustrated in FIG. 8B, the lug 82 engages with the lug 80 of the catch-plate 77 and the lug 81 of the end-cap 69 engages with the lug 80 of the catch-plate 79. Further rotation of the shaft 58 to complete one revolution brings about the regime illustrated in FIG. 8C.

Continued rotation of the shaft 58 to some 640 degrees from its initial position brings about the regime illustrated in FIG. 8D. In this the lug 80 of the catch-plate 79 engages with the lug 83 of the stationary flange 71, and the lug 80 of the catch-plate 77 engages with the lug 84 of the spool-part 73. Further rotation of the shaft 58 in the same sense relative to the shaft 62 is not possible; the spool 72 is restrained from rotation in this sense by the lug 80 of the catch-plate 78 interposed between the lug 84 of the spool-part 74 and the lug 83 of the flange 71, and the barrel 66 is restrained from rotation in the same sense by the lug 80 of the catch-plate 79 interposed between the lug 81 of the end-cap 69 and the lug 83 of the flange 71.

The lost-motion device returns to the normal regime illustrated in FIG. 6 if during either of the wind-up sequences illustrated in FIGS. 7A to D and 8A to D, the torque-loading falls below the threshold level set by the preloading of the spring 75. The return is made under the action of the spring 75, and eliminates any relative rotational displacement between the shafts 58 and 62 by causing rotation of each shaft 58 and 62 to the same extent as, but in the opposite sense to, that experienced during the winding-up operation.

Referring now more particularly to FIG. 4, any rotational displacement of either shaft 58 and 62 relative to the other is transformed into an axial displacement of a collar 86 screwed on the shaft 62. The collar 86 is engaged by two arms 87 that are carried with the shaft 58, each arm 87 extending the length of the lost-motion device to enter, in sliding-fit, a respective hole 88 in a flange 89 of the collar 86. Any rotation of the shaft 58 relative to the shaft 62 is accordingly transferred to the collar 86, and the sense of the resultant axial displacement of the collar 86 along the shaft 62 depends upon the sense of this relative rotation. The extent of the axial displacement provides a measure of the rotational displacement between the shafts 58 and 62.

Axial displacement of the collar 86 is effective to actuate an electrical switch 90 (providing the switch 20 of FIG. 1) connected in the electrical energization circuit of the electromagnetic clutch. The switch 90 has two feeler-arms 91 that are biased resiliently to adopt spaced positions on opposite sides of a pivoted lever 92. The lever 92 has a pin 93 that is retained within a circumferential guide 94 of the collar 86 such that the lever 92 pivots from a normal, central position by an extent dependent upon the axial displacement of the collar 86 along the shaft 62. The pivotal displacement of the lever 92 is of a sense dependent upon the sense of axial displacement of the collars 86, and, if sufficient, produces displacement of one or the other of the two feeler-arms 91, the particular one being dependent upon the sense of axial displacement of the collar 86. The switch 90 is actuated in response to displacement of either feeler-arm 91, and the spacing between the arms 91 is set such that actuation occurs when there is a rotational displacement of some 600 degrees between the shafts 58 and 62.

The switch 90 is accordingly actuated only in the event that torque-loading in excess of the threshold set by the preloading of the spring 75, is sustained on the torque-switch for long enough to result, through the lost-motion device, in a rotational displacement between the shafts 58 and 62 of some 600 degrees. Actuation of the switch 90 breaks the supply of energization current to the coil 52 of the electromagnetic clutch and the consequent disengagement of this clutch breaks the coupling through the assembly and thereby releases the loading. Although the switch 90 is no longer actuated after release of the loading, supply of current to the coil 52 and consequent engagement of the clutch, is re-established only in response to a re-selection operation performed by the pilot of the aircraft.

In the assembly described above only one cut-out switch, namely switch 90, is shown, but there are in fact three such switches and these are set to be actuated at different angles of rotational displacement between the shafts 58 and 62. The three switches, individually and in pairs, are effective in the energization circuit of the electromagnetic clutch for different modes of flight of the aircraft, and thereby enable different degrees of transient-tolerance to be used for different modes.

The assembly of torque-switch and electromagnetic clutch described above provides for the use of pre-set angles in excess of 360 degrees. Where pre-set angles of smaller extent are involved, then the alternative assembly of FIGS. 9 and 10 may be used. The assembly of FIGS. 9 and 10 is a modified form of the assembly described in British patent specification No. 929,761.

Referring to FIGS. 9 and 10, input drive to the assembly is applied from the servo motor 11 of the relevant sub-channel 2 to an input gear-wheel 110 that is secured by screws 111 to a yoke 112 of the electromagnetic clutch. The yoke 112 has an energizing coil 113 and current is applied to the coil 13 via slip-rings 114 secured to the gear-wheel 110.

Output drive from the electromagnetic clutch is taken from an armature 115 that is clamped to the inner peripheral portion of a corrugated, resilient annular-diaphragm 116 by means of a ring 117. The outer peripheral portion of the diaphragm 116 is clamped to a carrier 118 by a ring 119. The diaphragm 116 permits axial movement of the armature 115 relative to the carrier 118 during engagement and disengagement of the clutch, and at the same time provides, by virtue of a degree of pre-loading, spring bias that ensures positive disengagement when energization of the coil 113 ceases.

The carrier 118 is rotatably-mounted on an output shaft 120 of the assembly by means of a ball-bearing 121. The ball-bearing 121 is carried within a housing 122 that is fixed by a tapered pin 123 to a reduced end-portion 124 of the output shaft 120.

Two pins 125 that are carried with the carrier 118 extend radially outwards from diametrically-opposite points, across a gap 126 in the carrier 118. Each pin 125 is encircled by an individual ball-bearing 127 in the gap 126, and is locked in position within the carrier 118 by means of a housing-assembly 128, the assembly 128 being a press fit in the carrier 118 and being rotatably-mounted on the shaft 120 by means of a ball-bearing 129.

The ball-bearings 127 carried by the pins 125 act as cam-followers engaging a cam-track 130 on a cam-member 131. The cam-track 130 is formed with two diametrically-opposed W-shaped surfaces (see FIG. 11) each having a centrally-indented recess 132. The cam-member 131 is urged resiliently towards the carrier 118, and in normal circumstances the outer races 133 of the two ball-bearings 127 engage the track 130 centrally of the two recesses 132. However, with rotational displacement of the carrier 118 about the shaft 120 and relative to the cam-member 131, the outer races 133 ride up the sides of the recesses 132 towards apices 134 of the track 130, and this urges the cam-member 131 axially away from the carrier 118, that is to say, to the right in FIGS. 9 and 10. Eventually the races 133 may pass over the apices 134 and then down outer inclined faces 135 of the W-shaped surface, such that the resiliently-urged cam-member 131 now moves to the left, towards the carrier 118, back through the normal position adopted when the races 133 are accommodated in the recesses 132.

A disc 136 is secured to the cam-member 131, and axial movement of the disc 136 and cam-member 131 to the right, away from the carrier 118, actuates an electrical cut-out switch (not shown) corresponding to the switch 20 of FIG. 1, in the energization circuit of the electromagnetic clutch. Actuation of this cut-out switch breaks the supply of energization current to the coil 113 of the clutch, and is brought about only following substantial displacement of the outer races 133 away from their normal, central positions in the recesses 132. This is in contrast to the operation of the assembly described in patent specification No. 929,761, and arises from the extended form of recess 132 used in the present instance. The angular extent of the present form of recess 132 is indicated by FIG. 11 which shows in full line one of the W-shaped surfaces of the cam-track 130 in development. The corresponding development of the W-shaped surface used in the former assembly described in patent specification No. 929,761, is shown in the same figure in broken line, for comparison purposes.

Referring to FIG. 11, the apices 134 are spaced from the indented centre (zero degrees) of the recess 132 by some 53 degrees, as compared with some 3.5 degrees in the former assembly. From the centre of the recess 132 the track 130 is inclined upwardly towards each apex 134, firstly at a slope of 14.2 degrees through an angle of 45 degrees, and then more steeply through the remaining angle at a slope of 21.5 degrees. In the former construction the slope is 60 degrees throughout the limited angle provided, and actuation of the switch takes place at a cam-follower displacement-angle (in either sense) of just less than 2.25 degrees; the corresponding displacement-angle with the present construction is 40 degrees.

Returning to the description of the assembly shown in FIGS. 9 and 10, a thrust ball-bearing 137 that is carried by a sleeve 138, lies between the disc 136 and a flange 139 of the sleeve 138. The flange 139 is urged via a member 140, towards the disc 136 by a compressed helical spring 141, the spring 141 acting between the member 140 and a washer 142 that abuts a flange 143 of a cylindrical nut 144. The nut 144 is screwed on a threaded portion 145 of the output shaft 120, with an anti-friction liner 146 (of polytretrafluorethylene) disposed between it and the sleeve 138. Locking pins 147, engaging with grooves 148 in the shaft 120, extend through holes 149 in the nut 144 so as to lock the nut 144 in a selected position relative to the shaft 120.

Two pins 150 extend radially outwards from the shaft 120 at diametrically-opposite points, and each carries at its outer end 151 a ball-bearing 152 that engages with a respective one of two axially-extending slots 153 in a cylindrical extension 154 of the cam-member 131. In addition, the shaft 120 is provided with a gear wheel 155 and it is from this that the output drive of the assembly is taken.

Under normal conditions of operation of the assembly the preloading of the spring 141 is sufficient to maintain the races 133 centrally within the recesses 132 of the cam-member 131, and the ball-bearings 152 in these circumstances lie just within the axially-extending slots 153. There is in effect therefore a substantially solid interconnection of the armature 115 with the shaft 120. With the electromagnetic clutch energized under these conditions there is in substance direct drive between the gear wheels 110 and 155.

In the event that the torque-loading on the assembly is sufficient to overcome the preloading of the spring 141, the outer races 133 ride up within their recesses 132. The carrier 118 and cam-member 131 are in consequence rotationally displaced relative to one another (the particular one to be displaced is dependent upon whether the applied loading is from the input or output), and the cam-member 131 is axially displaced to the right. The characteristic of torque-loading versus rotational displacement between the carrier 118 and cam-member 131, is shown in full line in FIG. 12, the broken line representing the corresponding characteristic of the former assembly described in patent specification No. 929,761.

As indicated by FIG. 12, actuation of the cut-out switch in the energization circuit of the electromagnetic clutch results with the present construction only if a torque-loading somewhat in excess of that required to overcome the preloading of the spring 141, is sustained throughout 40 degrees of rotational displacement between the carrier 118 and cam-member 131; the corresponding range of rotational displacement in the case of the former construction is only some 2.25 degrees. The extended travel in the present instance, coupled with the inherent inertia of the system, has a damping effect ensuring that the cut-out switch is not actuated unnecessarily by transients in torque-loading.

When the torque-loading on the assembly returns to a level below the threshold set by the preloading of the spring 141, the spring 141 returns the carrier 118 and cam-member 131 to their normal angular orientation relative to one another such that the outer races 133 are returned to their central positions in the recesses 132. This applies both to the circumstances in which the torque-loading is a transient insufficient to result in a relative rotational displacement of 40 degrees, and to the circumstances in which the cut-out switch is actuated and the loading released by consequent disengagement of the electromagnetic clutch. In these latter circumstances, although the cut-out switch is no longer actuated, re-engagement of the clutch can take place only in response to re-selection by the pilot of the aircraft.

If for any reason the electromagnetic clutch fails to disengage, the application of an increasing torque causes the outer races 133 to ride further up the recesses 132, over the relevant apices 134, and then down the outer faces 135 of these. As the races 133 ride further up towards the apices 134 so the cam-member 131 is displaced axially further to the right, until with passage over the apices 134 the direction of displacement is reversed. The subsequent movement of the cam-member 131 to the left is assisted by the spring 141, and is sufficient to draw the axial slots 153 clear of the ball-bearings 152. This breaks the coupling between the cam-member 131 and the shaft 120, and thereby interrupts drive through the assembly. In order to re-establish this drive it is necessary to rotate the shaft 120 until the ball-bearings 152 are brought opposite the slots 153, and then re-set the cam-member 131 with the races 133 located centrally in their recesses 132.

The track 130 within each recess 132 is of increased slope (21.5 degrees) over the final stages to each apex 134, in order to avoid unnecessary interruption of drive between the cam-member 131 and shaft 120 that might otherwise result from inertial effects and inherent delay in disengagement of the electromagnetic clutch. The increase in slope requires, as indicated in FIG. 12, a significant increase in torque-loading before the connection between the cam-member 131 and the shaft 120 is broken.

Details of construction of each of the sub-channels 2 of FIG. 1, using the preferred, symmetrical form of equalization, and either of the two forms of assembly of torque-switch and clutch described above with reference to FIGS. 4 to 12, will now be described with reference to FIG. 13. This figure shows the details of sub-channel A alone (but the other two sub-channels B and C are of exactly the same form), with the assembly of torque-switch and clutch represented schematically as a block 200 coupled via an individual pinion 201 to a gear-wheel 202. The gear-wheel 202 forms the common coupling point 18 of FIG. 1, each sub-channel B and C being coupled to this via an individual pinion (not shown) corresponding to the pinion 201, and thence via the gearing 19 to the aerodynamic control-surface 1.

Referring to FIG. 13, the pitch-manoeuvre demanded signal derived by the computer 3 from the signals supplied by the flight-instrument set 4 is supplied in the sub-channel to a signal-combining circuit 210 to be opposed there by the output signal of an equalizer 211. The output signal of the equalizer 211 is dependent upon the signal derived by the rate gyroscope 5, this latter signal being applied to the equalizer 211 via a phase-advancing network 212. The signal from the circuit 210 is thus dependent upon the difference between the demanded and actual rates of pitch of the aircraft, and is supplied to a further signal-combining circuit 213. The output signal of the circuit 213 is applied via a servo amplifier 214 to energize the two-phase electro servomotor 11 of the sub-channel. The signal derived in accordance with the rate of rotation of the motor-shaft 12 by the tacho-generator 13, is applied to the signal-combining circuit 213 as degenerative rate-feedback.

A relay 215 is energized in series with the reference-phase winding of the motor 11 so that a set of contacts 216 of the relay 215 remains closed only while energization-current is being supplied to the motor 11. The set of contacts 216 is connected in the energization circuit of the electromagnetic clutch 15 of the assembly 200, in series with a further set of contacts 217. A signal injector-detector test unit 218 that is connected between the output and input of the servo amplifier 214 maintains the set of contacts 217 closed only while the amplifier 214 is operative to energize the motor 11. The unit 218 injects a small signal into the amplifier 214 at the input and maintains the set of contacts 217 closed only so long as it continues to detect the appearance of the injected-signal at the output.

The output signal of the servoamplifier 214 is supplied to each of two comparator-limiter units 219 and 220, and also to the corresponding units in sub-channels C and B via sets of contacts 221 and 222 respectively. The unit 219 receives the output signal of the servoamplifier of sub-channel B and derives a signal in accordance with the difference between this and the output signal of the amplifier 214. The unit 220, on the other hand, receives the output signal of the servoamplifier of the sub-channel C and derives a signal in accordance with the difference between this and the output signal of the amplifier 214. The signals derived by the units 219 and 220 are both limited in magnitude (the limits imposed being the same in the two cases), and are added together by a signal-combining circuit 223 to provide the basic equalization signal of the sub-channel A.

Short-term datum equalization is provided in the sub-channel by application of the combined output signal of the circuit 223 directly to the signal-combining circuit 213. Long-term datum equalization, on the other hand, is provided by application to the circuit 213 of the output signal of an integrator circuit 224 that is supplied with the output signal of the circuit 223. The integrator circuit 224 is also supplied with the output signal of the demand computer 3 so that the signal supplied to the circuit 213 from the integrator circuit 224 is representative of the integral with respect to time of the additive combination of the signals from the computer 3 and the circuit 223. Thus, in addition to including a component providing long-term datum equalization, the signal supplied from the integrator circuit 224 includes a component providing a measure of long-term monitoring. The monitoring provided in this latter respect acts to obviate datum-drift that would otherwise occur in the signal applied to the circuit 213 in the event of a change from zero in the normal datum level of the demand signal derived by the computer 3.

Gain equalization is provided in the sub-channel by application of the combined output signal of the circuit 223 to a gain-equalizer 225 associated with the tacho-generator 13. The signal from the circuit 223 is supplied to the gain-equalizer 225 via a multiplier circuit 226, the multiplier circuit 226 effecting a reversal of sense of this signal according to the sense of the output signal of the tacho-generator 13 as detected by a sign-sensor circuit 227. The gain-equalizer 225 regulates the alternating-current energization of the tacho-generator 13 in accordance with the signal supplied from the multiplier circuit 226. In this respect, the gain-equalizer 225 causes the amplitude of the energization voltage to depart from a normal non-zero datum value by an amount dependent upon the magnitude of the signal from the multiplier circuit 226, and in a sense dependent upon the sense of that signal. The gain-equalizer 225 accordingly acts to regulate the degree of degenerative rate-feedback, and therefore the overall gain of the servo, in accordance with the equalization signal supplied by the circuit 223. The gain is increased or decreased in dependence upon the sense of the feedback, which in general corresponds to the sense of the output signal of the circuit 213, such as to tend to reduce the output signal of the circuit 223.

Finally, input-gain equalization is provided in the sub-channel by application of the output signal of the circuit 223 to the equalizer 211 via a multiplier circuit 228. The multiplier circuit 228 effects reversal of the sense of the signal from the circuit 223 according to the sense of the output signal of the phase-advance network 212 as detected by a sign-sensor circuit 229. The equalizer 211 regulates the level of signal supplied from the network 212 to the signal-combining circuit 210, and in this respect acts to provide variable gain between the network 212 and circuit 210, the gain departing from a nominal unit-value to an extent and in a sense dependent upon the magnitude and sense respectively of the sigal from the multiplier circuit 228. The equalizer 211 accordingly acts to regulate the proportionality between the signal supplied to the circuit 210 and the rate of angular movement sensed by the rate gyro 5, and this correspondingly modifies the relationship between this signal and the demand signal supplied by the computer 3. The proportionality is increased or decreased in the appropriate sense relative to that of the signal from the network 212, to reduce the output signal of the circuit 223.

Although in the system described above, input equalization is effected by regulation of the signal applied to the circuit 210 from the network 212, it may alternatively, or in addition, be effected by regulation of the signal applied to the circuit 210 from the computer 3. In either instance, an equalizer corresponding to the equalizer 211 is connected between the computer 3 and circuit 210, and a sign-sensor circuit corresponding to the sign-sensor circuit 229, is provided to respond to the sense of the output signal of the computer 3.

Gain equalization may also be effected by connecting the equalizer 225 in the rate-feedback path between the tacho-generator 13 and the circuit 213 (rather than in the energization circuit as shown) so as to regulate the gain of this path. Alternatively, the equalizer 225 may be connected in the manner of a variable-gain pre-amplifier to amplify a combined form of the output signals of the circuits 210, 223 and 225, before these are combined in the circuit 213 with the degenerative rate-feedback signal from the tacho-generator 13.

I claim:

1. An automatic control system comprising a drivable output member and a multiplex control-channel for driving the output member, wherein said control-channel is formed by at least two sub-channels for providing nominally-equivalent output drives to the output member and includes an equalizing means for acting in the sub-channels to balance out operationally-acceptable differences arising between them, said equalizing means including both long-term and short-term equalizing means for balancing out any said differences that would otherwise result in substantially-continuous and transient disagreements of less than a predetermined threshold level between the outut drives of said sub-channels, and wherein each sub-channel includes a selectively-disengageable coupling for applying the output drive of the respective sub-channel to said output member, and disengaging means operable to disengage the said coupling in response to disagreement exceeding said threshold level between the output drive of the respective sub-channel and the output drive applied to the said output member by each other of said sub-channels, said disengaging means having a delayed-operation characteristic to provide for the disengagement of said coupling only in response to sustained disagreement in excess of said threshold level, whereby short-period transient disagreements are ineffective to produce disengagement of the coupling.

2. An automatic control system according to claim 1 wherein said disengaging means of each sub-channel comprises input and output elements mounted for displacement relative to one another, means actuable to disengage the coupling in response to displacement of a predetermined substantial extent between said input and output elements, and means for opposing resiliently any said displacement of said input and output elements relative to one another.

3. An automatic control system according to claim 1 wherein the said coupling of each sub-channel is an electromagnetic clutch having an electrical energization path individual thereto, and wherein the said disengaging means of each sub-channel includes an electric switch that is actuable to interrupt the energization path to the clutch of the respective sub-channel.

4. An automatic control system according to claim 1 in which there are at least three sub-channels, wherein each sub-channel includes comparator means for effecting a comparison between the output drive of the respective sub-channel and the output drive of at least one other of the sub-channels, and means responsive to the result of the comparison to act in the respective sub-channel to tend to balance out any difference between the compared output drives.

5. An automatic control system according to claim 4 wherein the said comparator means in each sub-channel effects comparison between the output drive of the respective sub-channel and the output drive of each other of the sub-channels.

6. An automatic control system according to claim 1 wherein each sub-channel includes an electrical servomotor to provide the output drive of the respective sub-channel, an electrical servoamplifier for supplying an electric signal to energize the servomotor, a comparator for comparing the energizing signal with the corresponding energizing signal supplied by the servoamplifier of another of said sub-channels to derive a signal dependent upon any difference between them, and a feedback arrangement for applying degenerative feedback in the respective sub-channel, said feedback arrangement including means for providing a component of said feedback in accordance with the derived difference signal.

7. An automatic control system according to claim 6 wherein said feedback arrangement of each sub-channel includes an integrator for deriving a signal dependent upon the integral with respect to time of the difference signal derived by the comparator of that respective sub-channel, and means for supplying the signal derived by the integrator to the servoamplifier of the respective sub-channel as a component of said degenerative feedback.

8. An automatic control system according to claim 6 in which there are at least three sub-channels, wherein each sub-channel includes a plurality of comparators for comparing the energizing signal of that sub-channel with the corresponding energizing signal of each other sub-channel to derive signals dependent upon any differences between the compared signals, and wherein said feedback arrangement of each sub-channel includes an integrator for deriving a signal dependent upon the integral with respect to time of the difference signals derived by the comparators of that respective sub-channel, and means for supplying the signal derived by the integrator to the servoamplifier of the respective sub-channel as a component of said degenerative feedback.

9. An automatic control system comprising a rotatable output member and a multiplex control-channel for controlling rotation of the output member, wherein said control-channel is formed by at least three sub-channels for applying nominally-equivalent output torques to the outut member and includes an equalizing means for acting in the sub-channels to balance out operationally-acceptable differences arising between them, said equalizing means including both long-term and short-term equalizing means for balancing out any said differences that would otherwise result in substantially-continuous and transient disagreements of less than a predetermined threshold level between the output torques of said sub-channels, and wherein each sub-channel includes a servo motor for providing the output torque of the respective sub-channel, a selectively-disengageable clutch, a torque-switch for disengaging the clutch in response to application to the torque-switch of a torque-loading in excess of said threshold level, and means for applying the output torque provided by the motor to said output member via said clutch and torque-switch in series, said torque-switch comprising a rotatable input element, a rotatable output element, a resiliently pre-loaded lost-motion device intercoupling said input and output elements to provide for rotation of the two elements relative to one another only in response to the application therebetween of torque sustained in excess of said threshold level, and means actuable to disengage the clutch in response to relative rotation between said input and output elements of a predetermined substantial extent.

10. An automatic control system according to claim 9 wherein said predetermined extent of relative rotation exceeds 360 degrees.

11. An automatic control system according to claim 9, which is coupled to at least one movable aerodynamic control surface of an aircraft to control movement of said control surface.

12. An automatic control system according to claim 11 including at least three command-generating means for generating nominally-equivalent commands for rate of control-surface movement, and means for applying the commands derived by the different command-generating means to different ones of said sub-channels, each sub-channel being responsive to the command applied thereto to provide output drive in accordance with the commanded rate.

13. An automatic control system according to claim 9 wherein each sub-channel includes an electrical servo-amplifier for supplying an electric signal to energize the servo motor of the respective sub-channel, a comparator for comparing the energizing signal with the corresponding energizing signal supplied by the servoamplifier of another of said sub-channels so as to derive a signal dependent upon any difference between them, and a feedback arrangement for applying degenerative feedback in the respective sub-channel, said feedback arrangement including means for providing a component of said feedback in accordance with the derived difference signal.

14. An automatic control system according to claim 13 wherein said feedback arrangement of each sub-channel includes an integrator for deriving a signal dependent upon the integral with respect to time of the difference signal derived by the comparator of that respective sub-channel, and means for supplying the signal derived by the integrator to the servoamplifier of the respective sub-channel as a component of said degenerative feedback.

15. An automatic control system according to claim 13 wherein each sub-channel includes a plurality of comparators for comparing the energizing signal of that sub-channel with the corresponding energizing signal of each other sub-channel to derive signals dependent upon any differences between the compared signals, and wherein said feedback arrangement of each sub-channel includes an integrator for deriving a signal dependent upon the integral with respect to time of the difference signals derived by the comparators of that respective sub-channel, and means for supplying the signal derived by the integrator to the servoamplifier of the respective sub-channel as a component of said degenerative feedback.

16. An automatic control system comprising a rotatable output member and a multiplex control-channel for controlling rotation of the output member, wherein said control-channel is formed by at least two sub-channels for applying nominally-equivalent output torques to the output member and includes an equalizing means for acting in the sub-channels to balance out operationally-acceptable differences arising between them, said equalizing means including both long-term and short-term equalizing means for balancing out any said differences that would otherwise result in substantially-continuous and transient disagreements of less than a predetermined threshold level between the output torques of said sub-channels, and wherein each sub-channel includes a servomotor for providing the output torque of the respective sub-channel, a selectively-disengageable clutch, a torque-switch for disengaging the clutch in response to application to the torque-switch of a torque-loading in excess of said threshold level, and means for applying the output torque provided by the motor to said output member via said clutch and torque-switch in series, said torque-switch having a delayed-operation characteristic to provide for the disengagement of said clutch only in response to torque-loading sustained in excess of said threshold level, whereby short-period transient disagreements between the output torques of said sub-channels are ineffective to produce disengagement of the clutch.

17. An automatic control system according to claim 16 wherein said torque-switch comprises a rotatable input element, a rotatable output element, a resiliently pre-loaded lost-motion device intercoupling said input and output elements to provide for rotation of the two elements relative to one another only in response to the application therebetween of torque in excess of said threshold level, and means actuable to disengage the clutch in response to relative rotation between said input and output elements of a predetermined substantial extent.

18. An automatic control system according to claim 16 wherein each sub-channel includes an electrical servo-amplifier for supplying an electric signal to energize the servo motor of the respective sub-channel, a comparator for comparing the energizing signal supplied by the servo-amplifier of another of said sub-channels so as to derive a signal dependent upon any difference between them, and a feedback arrangement for applying degenerative feedback in the respective sub-channel, said feedback arrangement including means for providing a component of said feedback in accordance with the derived difference signal.

19. An automatic control system according to claim 18 in which there are at least three sub-channels, wherein each sub-channel includes a plurality of comparators for comparing the energizing signal of that sub-channel with the corresponding energizing signal to each other sub-channel to derive signals dependent upon any differences between the compared signals, and means for applying the derived difference signals degeneratively in the respective sub-channel.

20. An automatic control system according to claim 16, which is coupled to at least one movable aerodynamic control surface of an aircraft to control movement of said control surface.

21. An automatic control system according to claim 16 for use in control of at least one aerodynamic control-surface of an aircraft, the system including at least two command-generating means for generating nominally-equivalent commands for rate of control-surface movement, and means for applying the commands derived by the different command-generating means to different ones of said sub-channels, each sub-channel being responsive to the command applied thereto to provide output drive in accordance with the commanded rate.

References Cited
UNITED STATES PATENTS

| | | |
|---|---|---|
| 3,054,039 | 9/1962 | Meredith. |
| 3,156,855 | 11/1964 | Righton et al. |
| 3,190,586 | 6/1965 | Righton. |
| 3,309,588 | 3/1967 | Martin et al. |

BENJAMIN DOBECK, Primary Examiner